United States Patent
Deval et al.

(10) Patent No.: US 11,722,570 B1
(45) Date of Patent: Aug. 8, 2023

(54) SHARING SDN POLICY STATE INFORMATION BETWEEN SDN APPLIANCES

(71) Applicant: Microsoft Technology Licensing, LLC, Redmond, WA (US)

(72) Inventors: Manasi Deval, Redmond, WA (US); Elliot James Edmunds, Kirkland, WA (US); Sumit Sharad Dhoble, Redmond, WA (US); Soumya Sucharita Mishra, Redmond, WA (US); Jonathan Paul Rosenberg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/744,587

(22) Filed: May 13, 2022

(51) Int. Cl.
| H04L 12/24 | (2006.01) |
| H04L 12/46 | (2006.01) |
| H04L 67/142 | (2022.01) |
| H04L 67/141 | (2022.01) |
| H04L 67/1095 | (2022.01) |

(52) U.S. Cl.
CPC ........ H04L 67/142 (2013.01); H04L 67/1095 (2013.01); H04L 67/141 (2013.01)

(58) Field of Classification Search
CPC .. H04L 67/142; H04L 67/1095; H04L 67/141
USPC ......................................................... 709/227
See application file for complete search history.

(56) References Cited

U.S. PATENT DOCUMENTS

| 9,038,151 B1 | 5/2015 | Pearce |
| 9,983,951 B2 * | 5/2018 | Lad ..................... H04L 67/1097 |
| 2006/0198296 A1 | 9/2006 | Majee et al. |
| 2015/0009800 A1 | 1/2015 | Koponen et al. |
| 2019/0386959 A1 | 12/2019 | Menten et al. |

(Continued)

FOREIGN PATENT DOCUMENTS

| CN | 110381025 A * | 10/2019 | ............. H04L 63/02 |
| WO | WO-2014114119 A1 * | 7/2014 | ......... H04L 41/0663 |

(Continued)

OTHER PUBLICATIONS

Song et al., machine translation of CN 110381025 A, Oct. 2019 (Year: 2019).*

(Continued)

*Primary Examiner* — Ruolei Zong
(74) *Attorney, Agent, or Firm* — Schwegman Lundberg & Woessner, P.A.

(57) ABSTRACT

A computer implemented method includes receiving partially created software defined network (SDN) policy state information at a backup software defined network (SDN) appliance in response to the sending of a synchronize packet to establish a connection. The state information corresponds to a state of the connection between two endpoints that include a first active SDN appliance and a second active SDN appliance. A replica of the SDN policy state information is saved at the backup SDN appliance. An update to the SDN policy state information is received in response to the sending of an acknowledgement packet. The replica of the SDN policy state information updated at the backup SDN appliance to enable the backup SDN to transition to active.

20 Claims, 5 Drawing Sheets

(56) References Cited

U.S. PATENT DOCUMENTS

2020/0007629 A1* 1/2020 Tse .................... H04L 67/1008
2020/0394060 A1* 12/2020 Chandrappa .......... H04L 41/342
2021/0211359 A1* 7/2021 Wang .................... H04L 41/044

FOREIGN PATENT DOCUMENTS

WO    WO-2016172926 A1 * 11/2016 ............. H04L 29/08
WO    WO-2017152754 A1 * 9/2017 ............. H04L 29/06

OTHER PUBLICATIONS

"International Search Report and Written Opinion Issued in PCT Application No. PCT/US23/013380", dated May 17, 2023, 13 Pages.

* cited by examiner

SHARING SDN POLICY STATE INFORMATION BETWEEN SDN APPLIANCES

BACKGROUND

A software defined network (SDN) can be expensive to implement in data centers. Some data center implementations utilize SDN appliances to implement SDN policies for managing connections between entities running on multiple bare metal processors, referred to as processing nodes in an equipment rack. The use of SDN appliances relieves each of the bare metal processors from having to be modified to accommodate SDN networks, reducing the cost of the bare metal processors.

The SDN appliances may be thought of as middleboxes. Such middleboxes can be replicated to provide high availability and disaster recovery by allowing connections to fail over from one processing node to another. The connections are lost during such a fail over and need to be recreated, delaying resumption of packet communications and delaying processing and copying of data.

SUMMARY

A computer implemented method includes receiving partially created software defined network (SDN) policy state information at a backup SDN appliance in response to the sending of a synchronize packet to establish a connection. The state information corresponds to a state of the connection between two endpoints that include a first active SDN appliance and a second active SDN appliance. A replica of the state information is saved at the backup SDN appliance. An update to the SDN policy state information is received in response to the sending of an acknowledgement packet. The replica of the SDN policy state information updated at the backup SDN appliance to enable the backup SDN to transition to active.

DETAILED DESCRIPTION

Figure 1:
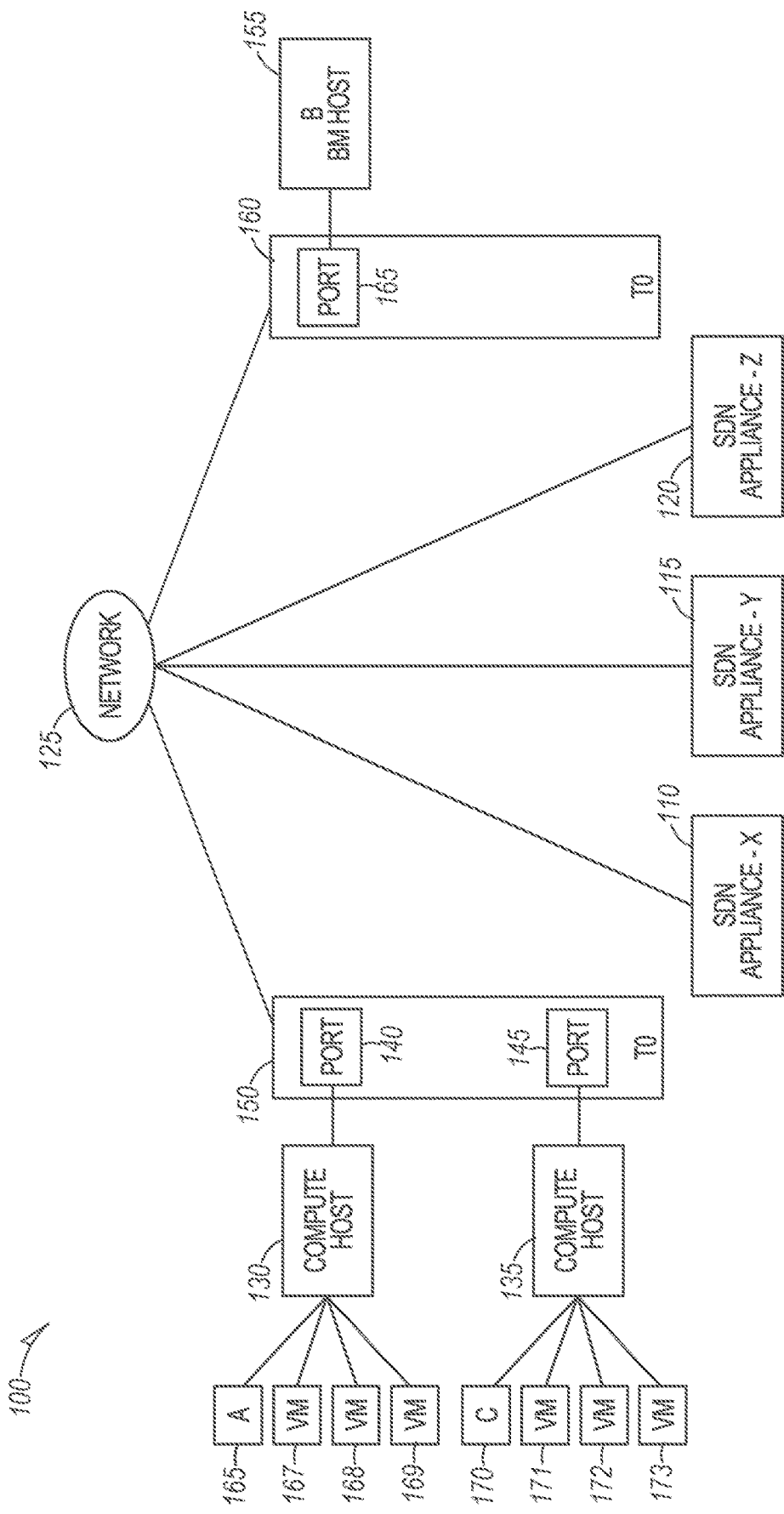
FIG. 1 is a block diagram of a network topology utilizing multiple SDN appliances according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

In prior deployment of software defined network (SDN) appliances that implement SDN policies for bare metal processing nodes, fail over of a connection causes the entire connection to be reset. A state of such a connection at a source is lost but may be recreated at the destination. The connection state (referred to as state) corresponds to a state of the SDN policies and in conjunction with the state of the connection between two endpoints if required by the connection protocol. The state may include whether or not the connection is being established, is already established, is being used to transfer packets, and other information related to the connection. Example TCP connection states include LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, and CLOSED. Other states include time to live (TTL) of the connection and may contain necessary packet transformations for the SDN appliance to process packets. The state may reflect the state of other connection oriented and connectionless protocols in further examples. The recreation of state can delay a packet path until the state is re-established if re establishment of the state is even possible.

Some prior implementations may utilize a central coordinator for state. Such implementations have latency issues such that connection establishment time is significantly impacted. Further, the central coordinator becomes a single point of failure. Use of a central coordinator for state replication also has challenges scaling to larger numbers of transmission control protocol (TCP) connections that the SDN appliance can support.

An improved system distributes state and manages state across multiple SDN appliances in real time. The system can scale to a level of handling several hundred million active connections at a time. The system neither suffers from latency, nor scaling issues of prior solutions.

FIG. 1 is a block diagram of a network topology 100 utilizing multiple SDN appliances, including SDN appliance X at 110, SDN appliance Y at 115, and SDN appliance Z at 120. The appliances are shown as coupled to a circuit switching network 125. Multiple computing hosts 130 and 135 may also be coupled to the switch 125 via one or more ports 140, 145 in a local switch 150. In one example, hosts 130 and 135 may be bare metal processing resources that need not have SDN processing capabilities. Instead, the SDN appliances 110, 115, and 120 may provide SDN processing capabilities for executing SDN policies for creating and maintaining connections between the hosts 130, 135, and a remote host 155. The remote host 155 may be coupled to a remote local switch 160 via a port 165.

SDN policies include one or more processes that may be used to determine information about connections. Such information may include whether or not the connection has been completed and what is left to do to create or close the connection. Time for waiting may also be defined, such as how long to wait for a SYN-ACK (acknowledgement) packet following sending of a SYN packet, and what to do if the time expires. Options that may be defined include continuing to wait or close the connection. Other policies may be applied after the connection is fully set up, including specification of firewalls, the kind of tunneling, rate limits and costs for streams of packets associated with a guest, and other policies commonly performed in SDN network establishment and use.

Hosts 130 and 135 may be physically located on a rack in a data center in one example, along with local switch 150. Hosts 130 and 135 may also host one or more virtual machines (VMs) as indicated at 165, 167, 168 and 169, and at 170, 171, 172, and 173 respectively. In one example, a process A is executing on VM 165, a process C is executing on VM 165, and a process B is executing on host 155, which may or may not be executing a virtual machine.

To establish a connection between process A and process B, host 130 may utilize SDN appliance 110, labeled as "X" to create the connection through another SDN appliance 120, labeled as "Z" to host 155. Process A creates a SYN packet and sends it via SDN Appliance X to Process B. Process B receives the SYN packet and accepts it by creating a SYN-ACK packet and sending it via SDN Appliance Z to Process A. Process A completes the connection by generating and sending an ACK packet via SDN Appliance X to Process B. This connection establishment process is referred to as a three-way handshake in some examples and results in X and Z being the primary SDN appliances for the connection between A and B.

A state of the connection during and after establishment, may be shared by each of X and Z. In addition, Y also has a copy of the state during establishment and is a secondary SDN appliance. This allows Y to be a hot spare and become a primary should the connection fail over.

Figure 2:
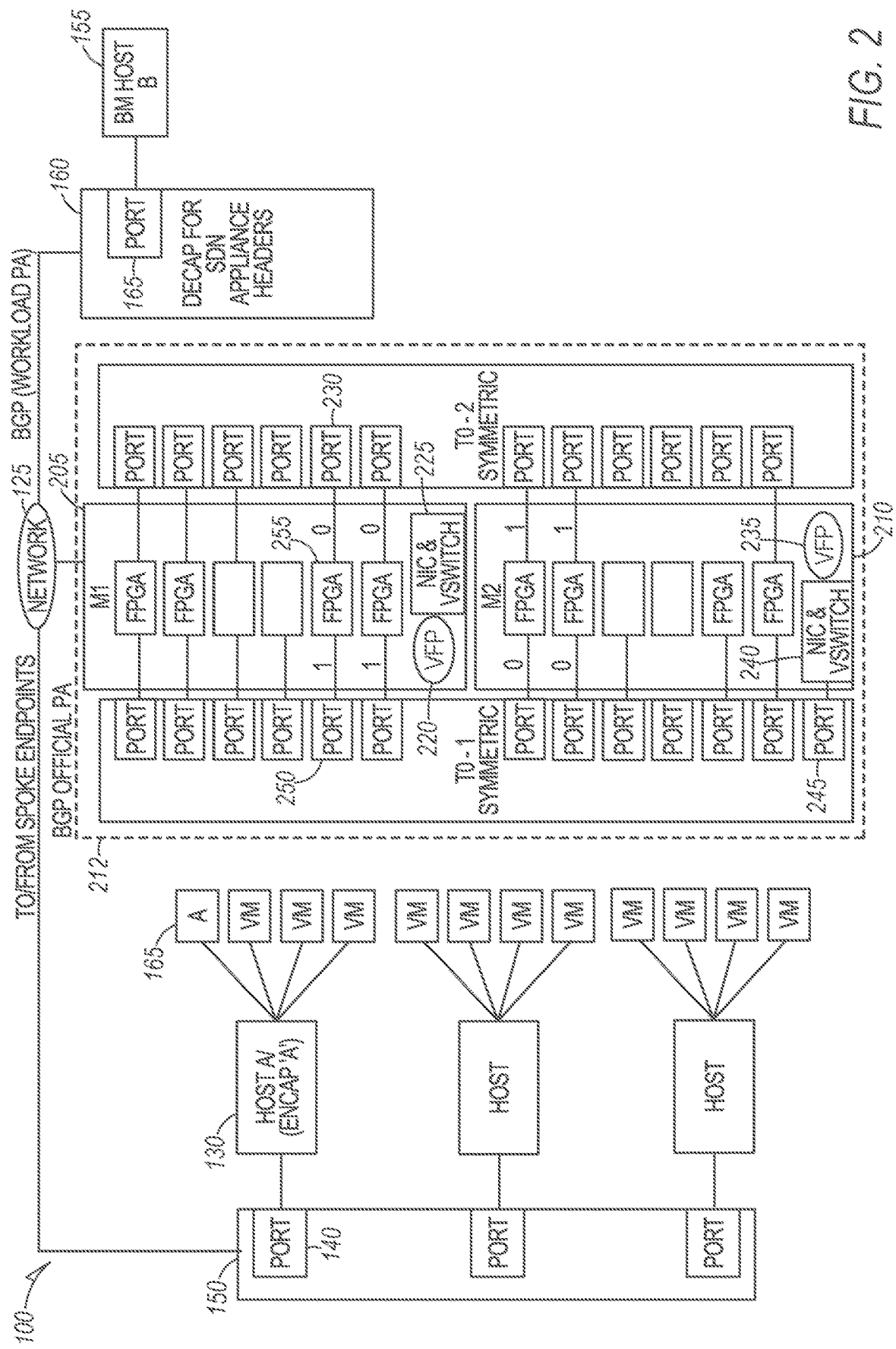
FIG. 2 is a block diagram illustrating a system that utilizes software defined network appliances for setting up connections between hosts according to an example embodiment.

FIG. 2 is a block diagram illustrating a system 200 that utilizes software defined network appliances for setting up connections between hosts. Reference numbers for elements in FIG. 1 are utilized to designate similar elements in FIG. 2. Two SDN appliance nodes M1 205 and M2 210 together operate as a single SDN appliance 212. SDN appliance 212 is shown with two SDN appliance switches 215 and 220 that each include multiple input and output ports split between node M1 205 and node M2 210. In one example, each of node M1 205 and node M2 210 have 12 ports. Input and output ports are coupled between programmable arrays.

Node M1 205 includes a virtual filtering platform (VFP) switch 220 and a network interface card and virtual switch 225 having a captive port 230. VFP switch 220 provides core SDN functionality for node M1 205.

Node M2 210 also includes a virtual filtering platform (VFP) switch 235 and a network interface card and virtual switch 240 having a captive port 245. VFP switch 235 provides core SDN functionality for node M2 210.

When a new connection is being setup from A to B, the SYN packet (in case of TCP) is tunneled to the SDN appliance 212 at A' in host 130. While the end node A' in host 130 encapsulated the packet in a tunnel, the bulk of the SDN operations like load balancing, gateway processing, firewall permissions and endpoint identification happen at the SDN appliance 212, relieving the host having to perform SDN operations. Equal-cost multi-path (ECMP) routing logic may choose node M1 205 or M2 210 and may also choose the specific port on the SDN appliance.

In one example the SYN packet or message progresses from host 130 to port 140 to switch 150 to port 250 to programmable array 255 to switch 160 to port 165 to host 155. Host 155 generates a SYN-ACK packet which travels from port 165 to switch 160 to port 230 to programmable array 255 to switch 150 to port 140 to host 130 to establish the connection between A and B. Appliance M2 210 is used for communication of the SYN-ACK as opposed to appliance M1 205 which was used for the original SYN packet.

The appliances M1 205 and M2 210, together define the SDN appliance 212. They have the ruleset associated with the source, A in host 130 VM 165 and destination B in host 155 of the packet. There may be several appliances in the network. Switches, such as switch 125 direct the packets to a closest SDN appliance.

The SDN appliance that gets the packet, processes the SDN ruleset and forwards the packet to B. At this point the VFP 220 saves the state of processing in a half open unified flow. A unified flow is a software construct that tracks the connection state and application of SDN policy in software. The connection state of half open means it policy has been applied in one direction. The full open state corresponds to policy application in both directions.

A returning SYN-ACK would take the opposite path. It may or may not land on the same node and port of the SDN appliance 212 as the SYN. For example, a SYN could have landed on M1, while SYN-ACK lands on M2. As an added level of complication, the SYN-ACK may have landed on a different SDN appliance altogether because that appliance is closer to B. A final ACK may be sent from A to B via the same route as the SYN packet to finalize the connection. Once the connection is no longer needed, it may be closed.

While a control plane keeps a connection state for each of the guests subscribing to an SDN appliance, the flow state is created dynamically during the three-way handshake. The creation of flow state also validates the connection establishment operation in each direction to collect it into a unified flow. In one example, unified flow state is shared across multiple SDN appliances.

A partially created state may be shared at each SDN appliance with every other SDN appliance such that each has a unified flow state. SDN appliance nodes are able to distinguish whether the flow state in both directions is complete. An SDN appliance is also aware if it is holding a primary or a backup state.

Switching the connection from the primary to the backup SDN appliance ensures the packet flow continues seamlessly without having to reestablish the connection.

Figure 3:
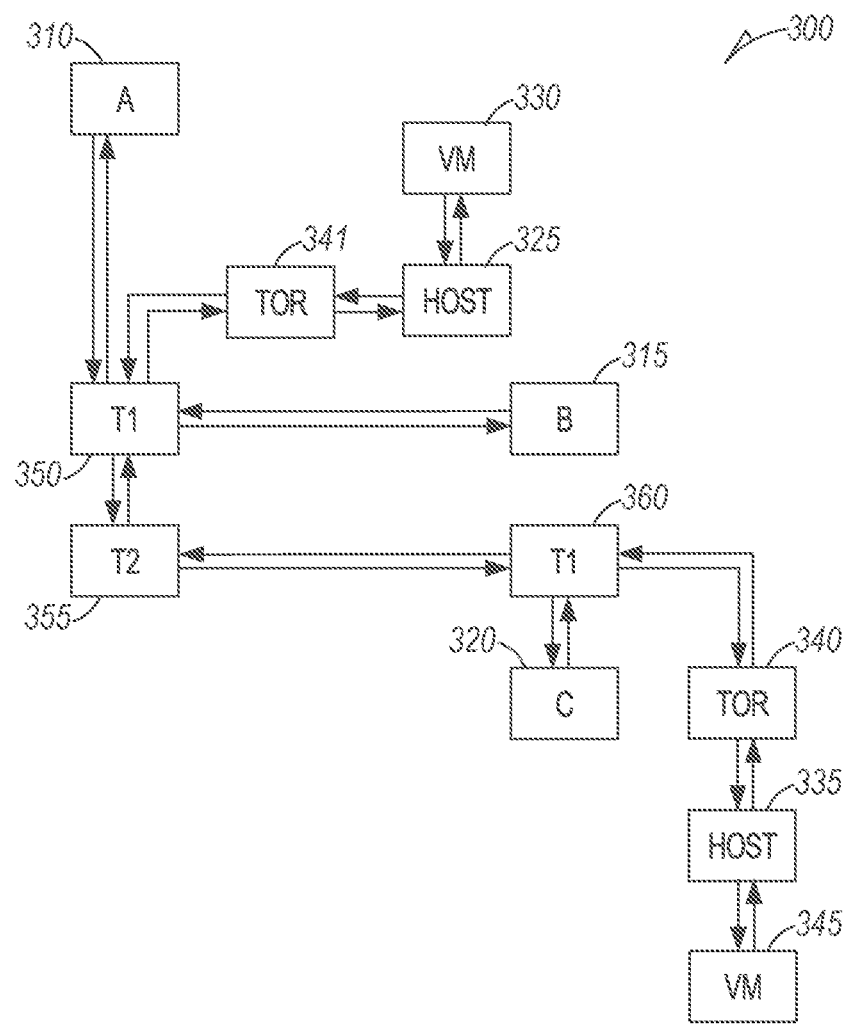
FIG. 3 is a block diagram illustrating sharing of a unified flow state between multiple SDN appliances according to an example embodiment.

FIG. 3 is a block diagram illustrating sharing of a unified flow state between multiple SDN appliances generally at 300. Three SDN appliances are shown at 310, 315, and 320 and are labeled as A, B, and C respectively. A host 325 is shown along with a virtual machine (VM) 330 supported by the host 325. The two hosts 325 and 335 and the two top of rack (TOR) switches 341 and 340 support virtual machines 330 and 345 respectively. The TOR switches 340 and 341 are coupled to the SDN appliances 310, 315, and 320 by multiple switches 350, 355, and 360. In various examples, an identifier of a unified flow (SDN policy state), of a SYN packet may be sent in the payload of an ICMP (Internet control message protocol) tunneled packet to the other SDN appliances. In one example, an application or process running on virtual machine 330 may desire a connection to another endpoint on a different host.

The application or process generates a SYN to initiate a connection. To initiate the connection, host 325 sends the SYN via switch 341 to switch 350, which forwards the SYN to the SDN appliance 310. SDN appliance 310 generates the SDN policy state and shares it with the other SDN appliances 315 and 320 by putting the SDN policy state in the payload of an ICMP packet, which is sent to appliance 315 and 320. The SDN appliances 315 and 320 use the payload to create policy states in a passive mode.

After sending the policy state to appliance 315 and 320, appliance 310 sends the SYN packet to switch 350 to switch 355, to switch 360, to switch 340, and host 335 to VM 345.

To accept the connection, a SYN-ACK is generated by VM 345 and sent via host 335, switch 340, and switch 360 to SDN appliance 320.

If policy state from appliance 310 is already on appliance 320, appliance 320 processes the SYN-ACK using the policy state which it received from SDN appliance 310, which it updates according to metadata in the header of the SYN-ACK. SDN appliance 320 then sends the resulting policy state to SDN appliance 310 and SDN appliance 315 with a similar ICMP-based mechanism. SDN appliance 320 then sends the SYN-ACK to VM 330.

If policy state from SDN appliance 310 is not already on SDN appliance 320, SDN appliance 320 will send a policy state request packet to SDN appliances 310 and 315 using an ICMP-based mechanism. The policy state request packets will contain enough information for SDN appliances 310 and 315 to determine which policy state is requested. After receiving the policy state request, SDN appliance 315 will determine that it does not have the active policy state, so it will not reply. SDN appliance 310 will determine that it has the active policy state, so it will reply to appliance 320 with the current policy state using an ICMP-based mechanism. SDN appliance 320 will now process the SYN-ACK using the policy state which it received from SDN appliance 310, which it updates according to metadata in the header of the SYN-ACK. SDN appliance 320 then sends the resulting policy state to SDN appliance 310 and SDN appliance 315 with a similar ICMP-based mechanism. SDN appliance 320 then sends the SYN-ACK to VM 330.

The SDN appliances will maintain active unified flows in an offloaded state and will maintain passive unified flows in software only. If an SDN appliance receives a policy state update request packet for an active unified flow, the SDN appliance will transition that unified flow to passive and remove the offloaded flow. If an SDN appliance receives a data packet on a passive unified flow, the SDN appliance will transition that unified flow to active mode, offload the flow, and send a policy state update request packet to the other SDN appliances using an ICMP-based mechanism. This may occur when a switch determines a failure and routes the packets to the passive mode SDN appliance.

Periodically, each SDN appliance which has a policy state in active mode will send a policy state keep-alive request packet the policy state with the other SDN appliances to avoid the passive unified flows expiring.

When an active unified flow is deleted on an SDN appliance (could be due to the unified flow timing out, or a connection-terminating data packet reaching the SDN appliance), the SDN appliance which deletes the active unified flow will send a policy state deletion packet to the other SDN appliances, alerting them that the unified flow has been deleted.

Figure 4:
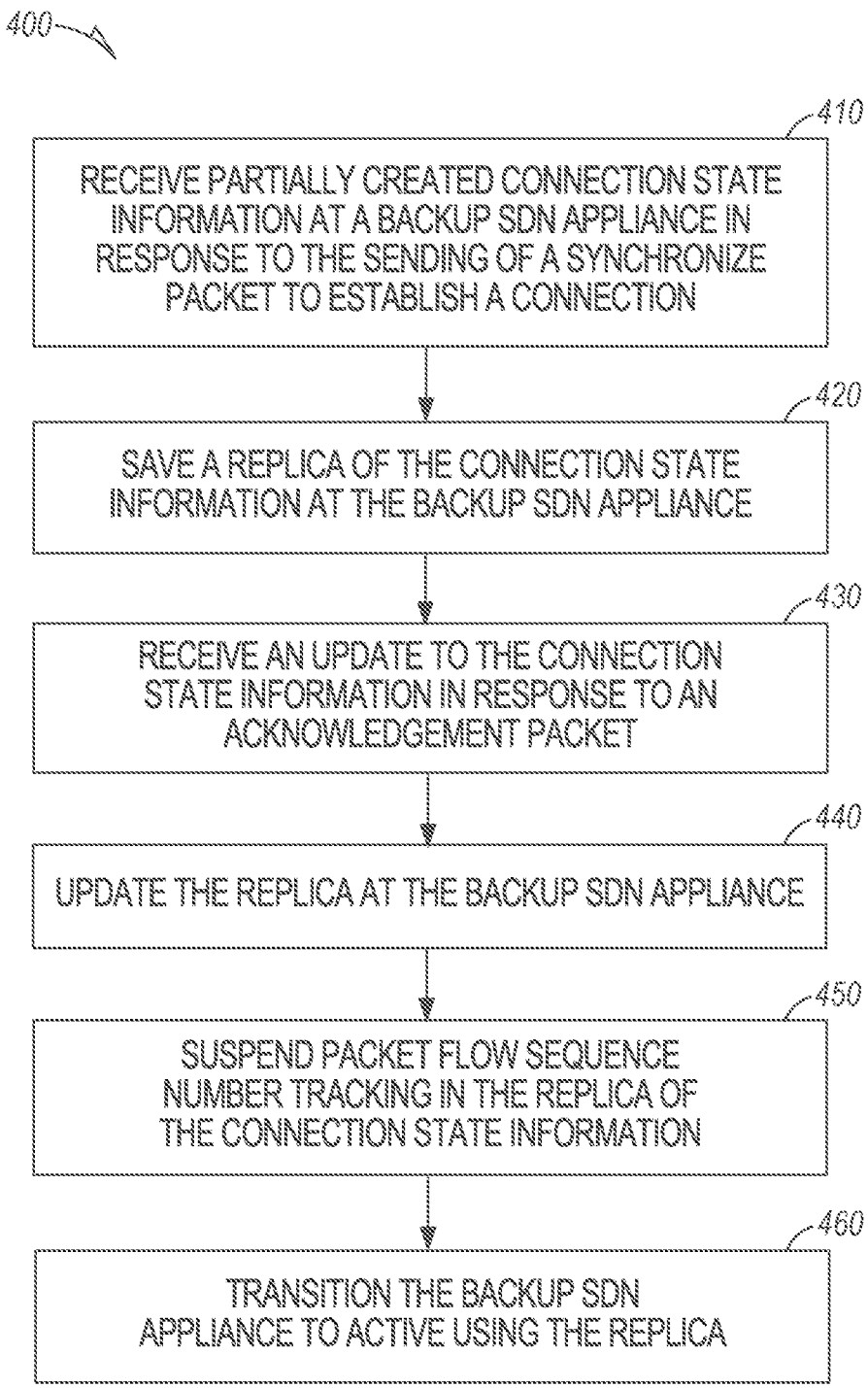
FIG. 4 is a flowchart of a computer implemented method for replicating flow state among SDN appliances to facilitate SDN communications between systems according to an example embodiment.

FIG. 4 is a flowchart of a computer implemented method 400 for replicating flow state among SDN appliances to facilitate SDN communications between systems. Method 400 begins at operation 410 by receiving partially created SDN policy state information at a backup SDN appliance in response to the sending of a synchronize packet to establish a connection. The state information corresponds to a state of the connection between two endpoints that include a first active SDN appliance and a second active SDN appliance.

In various examples, the state information may include policies or identification of policies for execution by the first and second SDN appliances and the backup SDN appliance in response to becoming active. The policies may include one or more of a firewall policy, a tunneling policy, a search policy, and other policies.

A replica of the SDN policy state information is saved at the backup SDN appliance at operation 420. At operation 430, an update to the SDN police state information is received in response to the sending of an acknowledgement packet. The replica of the SDN policy state information is updated at operation 440 at the backup SDN appliance to enable the backup SDN to transition to active. The replica of the SDN policy state information at the back SDN may be deleted in response to the connection ending.

In some examples updates to the SDN policy state information occur in response to the sending of a follow-up communication. This results in updating the replica of the SDN policy state information at the backup SDN appliance to enable the backup SDN to transition to active.

At operation 450, packet flow sequence number tracking in the replica of the SDN policy state information at the backup SDN appliance is suspended. State information is also shared between the first and second active SDN appliances to facilitate use and management of the connection.

At operation 460, in response to failure of one of the first and second SDN appliances, the backup SDN appliance is transitioned to active using the replica of the SDN policy state information to modify the backup SDN appliance to replace one of the first and second SDN appliances without resetting the connection. The transitioning of the backup SDN appliance to active may be triggered by the backup SDN appliance receiving a packet. Transitioning may include unsuspending packet flow sequence number tracking in the replica of the SDN policy state information at the now active backup SDN appliance.

Figure 5:
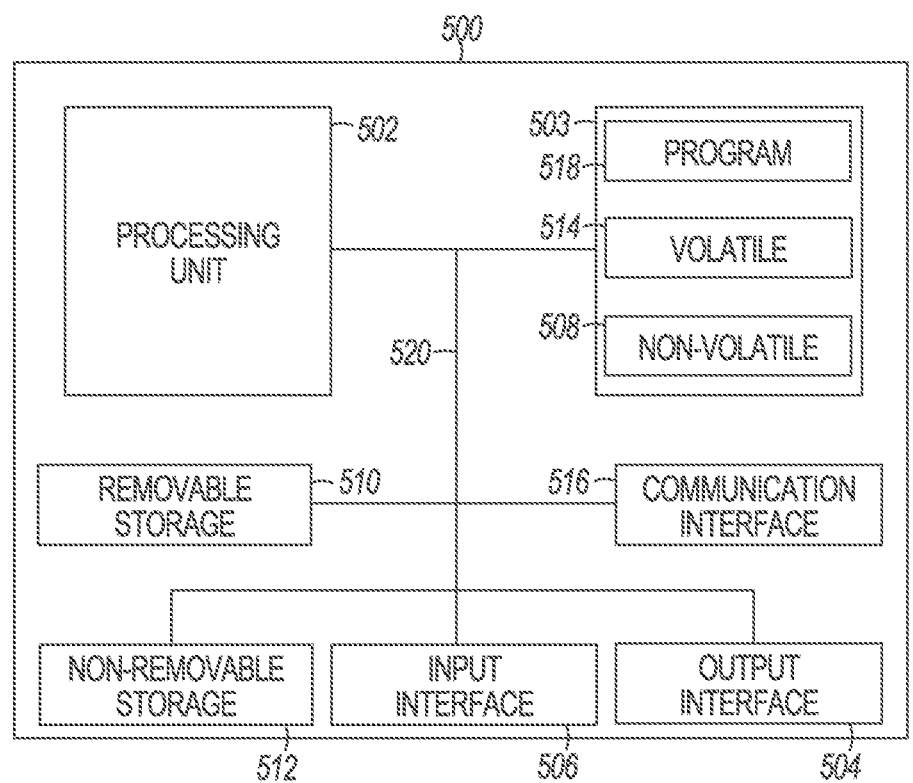
FIG. 5 is a block schematic diagram of a computer system to implement one or more example embodiments.

FIG. 5 is a block schematic diagram of a computer system 500 to implement improved SDN appliances with flow state replication, hosts, switches and other devices and systems for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through 110 channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 300 are connected with a system bus 520.

Computer-readable instructions stored on a computer-readable medium are executable by the processing unit 302 of the computer 300, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

EXAMPLES

A computer implemented method includes receiving partially created software defined network (SDN) policy state information at a backup software defined network (SDN) appliance in response to the sending of a synchronize packet to establish a connection. The state information corresponds to a state of the connection between two endpoints that include a first active SDN appliance and a second active SDN appliance. A replica of the SDN police state information is saved at the backup SDN appliance. An update to the SDN policy state information is received in response to the sending of an acknowledgement packet. The replica of the SDN policy state information updated at the backup SDN appliance to enable the backup SDN to transition to active.

2. The method of example 1 and further including suspending packet flow sequence number tracking in the replica of the SDN policy state information at the backup SDN appliance.

3. The method of any of example 1-2 and further including sharing state information between the first and second active SDN appliances.

4. The method of any of examples 1-3 and further including in response to failure of one of the rust and second SDN appliances, transitioning the backup SDN appliance to active using the replica of the SDN policy state information to modify the backup SDN appliance to replace one of the first and second SDN appliances without resetting the connection.

5. The method of any of examples 1-4 wherein the transitioning of the backup SDN appliance to active is triggered by the backup SDN appliance receiving a packet.

6. The method of example 5 and further including unsuspending packet flow sequence number tracking in the replica of the SDN policy state information at the now active backup SDN appliance.

7. The method of any of examples 1-6 and further including receiving an update to the SDN policy state information in response to the sending of a follow-up communication and updating the replica of the SDN policy state information at the backup SDN appliance to enable the backup SDN to transition to active.

8. The method of any of example 1-7 and further including deleting the replica of the SDN policy state information at the backup SDN in response to the connection being closed.

9. The method of any of examples 1-8 wherein the state information comprises policies for execution by the first and second SDN appliances and the backup SDN appliance in response to becoming active.

10. The method of any of examples 1-9 wherein the policies include a firewall policy.

11. The method of any of examples 1-10 wherein the policies include tunneling policy.

12. The method of an of examples 1-11 wherein the policies include a search policy.

13. A machine-readable storage device has instructions for execution by a processor of a machine to cause the processor to perform operations to perform any of the methods of examples 1-12.

14. A device includes a processor and a memory device coupled to the processor and having a program stored thereon for execution by the processor to perform operations to perform any of the methods of examples 1-12.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving partially created software defined network (SDN) policy state information at a backup software defined network (SDN) appliance in response to the sending of a synchronize packet to establish a connection, the state information corresponding to a state of the connection between two endpoints that include a first active SDN appliance and a second active SDN appliance;
   saving a replica of the SDN policy state information at the backup SDN appliance;
   receiving an update to the SDN policy state information in response to the sending of an acknowledgement packet; and
   updating the replica of the SDN policy state information at the backup SDN appliance to enable the backup SDN to transition to active.

2. The method of claim 1 and further comprising suspending packet flow sequence number tracking in the replica of the SDN policy state information at the backup SDN appliance.

3. The method of claim 1 and further comprising sharing state information between the first and second active SDN appliances.

4. The method of claim 1 and further comprising in response to failure of one of the first and second SDN appliances, transitioning the backup SDN appliance to active using the replica of the SDN policy state information to modify the backup SDN appliance to replace one of the first and second SDN appliances without resetting the connection.

5. The method of claim 1 wherein the transitioning of the backup SDN appliance to active is triggered by the backup SDN appliance receiving a packet.

6. The method of claim 5 and further comprising unsuspending packet flow sequence number tracking in the replica of the SDN policy state information at the now active backup SDN appliance.

7. The method of claim 1 and further comprising:
   receiving an update to the SDN policy state information in response to the sending of a follow-up communication; and
   updating the replica of the SDN policy state information at the backup SDN appliance to enable the backup SDN to transition to active.

8. The method of claim 1 and further comprising deleting the replica of the SDN policy state information at the backup SDN in response to the connection being closed.

9. The method of claim 1 wherein the state information comprises policies for execution by the first and second SDN appliances and the backup SDN appliance in response to becoming active.

10. The method of claim 1 wherein the policies comprise a firewall policy.

11. The method of claim 1 wherein the policies comprise tunneling policy.

12. The method of claim 1 wherein the policies comprise a search policy.

13. A machine-readable storage device having instructions for execution by a processor of a machine to cause the processor to perform operations to perform a method, the operations comprising:
   receiving partially created software defined network (SDN) policy state information at a backup software defined network (SDN) appliance in response to the sending of a synchronize packet to establish a connection, the state information corresponding to a state of the connection between two endpoints that include a first active SDN appliance and a second active SDN appliance;
   saving a replica of the SDN policy state information at the backup SDN appliance;
   receiving an update to the SDN policy state information in response to the sending of an acknowledgement packet; and
   updating the replica of the SDN policy state information at the backup SDN appliance to enable the backup SDN to transition to active.

14. The device of claim 13 wherein the operations further comprise suspending packet flow sequence number tracking in the replica of the SDN policy state information at the backup SDN appliance.

15. The device of claim 13 wherein the operations further comprise sharing state information between the first and second active SDN appliances.

16. The device of claim 13 wherein the operations further comprise in response to failure of one of the first and second SDN appliances, transitioning the backup SDN appliance to active using the replica of the SDN policy state information to modify the backup SDN appliance to replace one of the first and second SDN appliances without resetting the connection.

17. The device of claim 13 wherein the transitioning of the backup SDN appliance to active is triggered by the backup SDN appliance receiving a packet.

18. The device of claim 13 wherein the operations further comprise: receiving an update to the SDN policy state information in response to the sending of a follow-up communication; and updating the replica of the SDN policy state information at the backup SDN appliance to enable the backup SDN to transition to active.

19. A device comprising:
a processor; and
a memory device coupled to the processor and having a program stored thereon for execution by the processor to perform operations comprising:
receiving partially created software defined network (SDN) policy state information at a backup software defined network (SDN) appliance in response to the sending of a synchronize packet to establish a connection, the state information corresponding to a state of the connection between two endpoints that include a first active SDN appliance and a second active SDN appliance;
saving a replica of the SDN policy state information at the backup SDN appliance;
receiving an update to the SDN policy state information in response to the sending of an acknowledgement packet; and
updating the replica of the SDN policy state information at the backup SDN appliance to enable the backup SDN to transition to active.

20. The device of claim 19 wherein the operations further comprise:
receiving an update to the SDN policy state information in response to the sending of a follow-up communication; and
updating the replica of the SDN policy state information at the backup SDN appliance to enable the backup SDN to transition to active.

\* \* \* \* \*